Jan. 13, 1970 K. VOSSEN 3,488,807
EXTRUDER WITH OPENABLE DIE HEAD STRUCTURE AND DIE LOCKING MEANS
Filed April 24, 1968 3 Sheets-Sheet 1

INVENTOR.
KARL VOSSEN
BY Norbert P. Holler
ATTORNEY

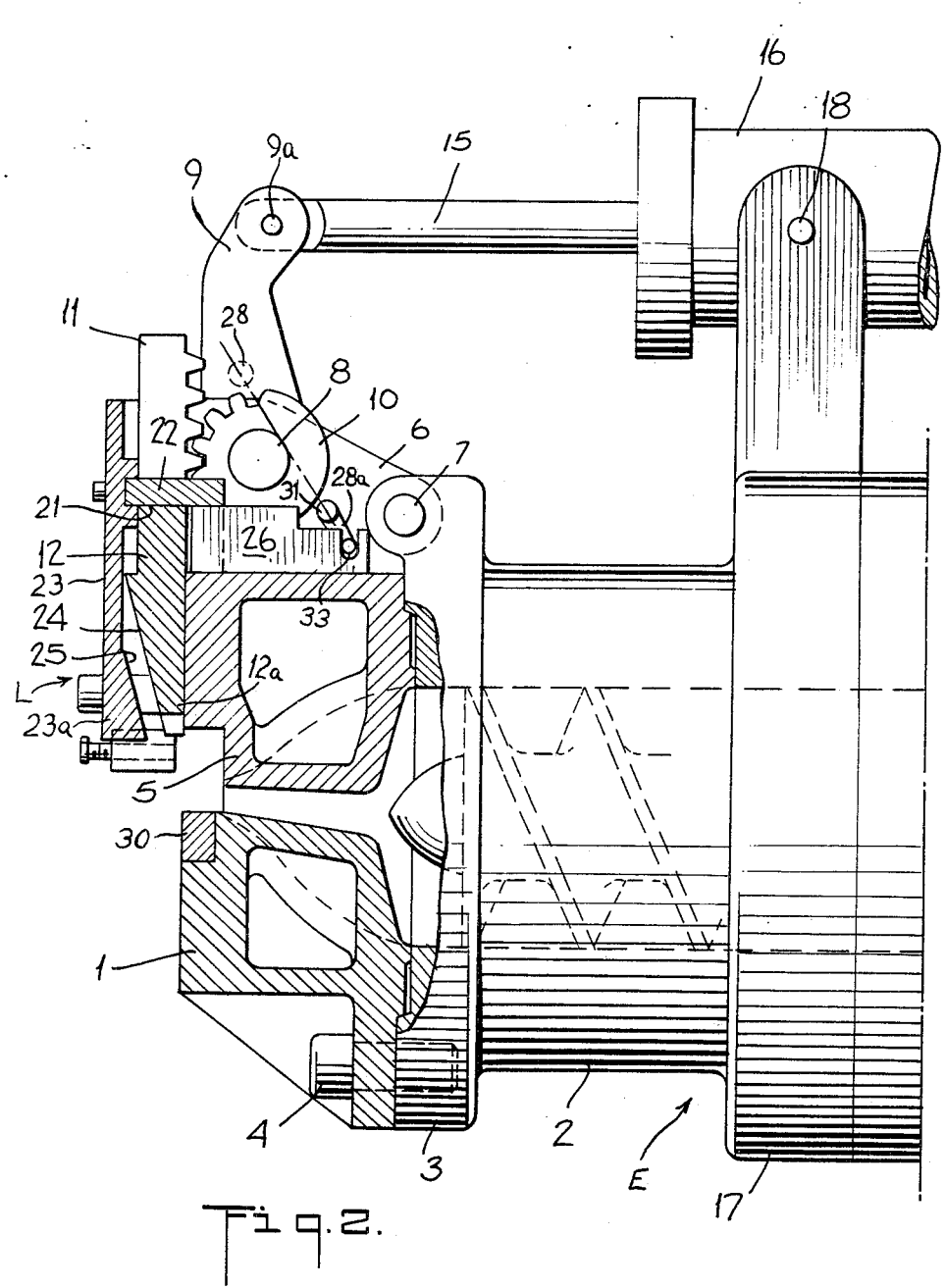

United States Patent Office 3,488,807
Patented Jan. 13, 1970

3,488,807
EXTRUDER WITH OPENABLE DIE HEAD STRUCTURE AND DIE LOCKING MEANS
Karl Vossen, Aachen, Germany, assignor to Un'royal Englebert Deutschland AG, Aachen, Germany, a corporation of Germany
Filed Apr. 24, 1968, Ser. No. 723,840
Claims priority, application Germany, May 2, 1967,
1,629,747
Int. Cl. B29d 3/01
U.S. Cl. 18—12                                            10 Claims

ABSTRACT OF THE DISCLOSURE

An extruder having an openable die head structure composed of a stationary member and a cooperating movable member which when in its operating position is adapted to be clamped to both the machine head and the stationary member. The movable member carries a replaceable profiled die element and is provided with a gib and key for releasably locking the die element in its operating position. Means are provided for either jointly or selectively and in any desired sequence shifting the key and the movable die head member into and out of their respective operating positions.

---

Figure 1:
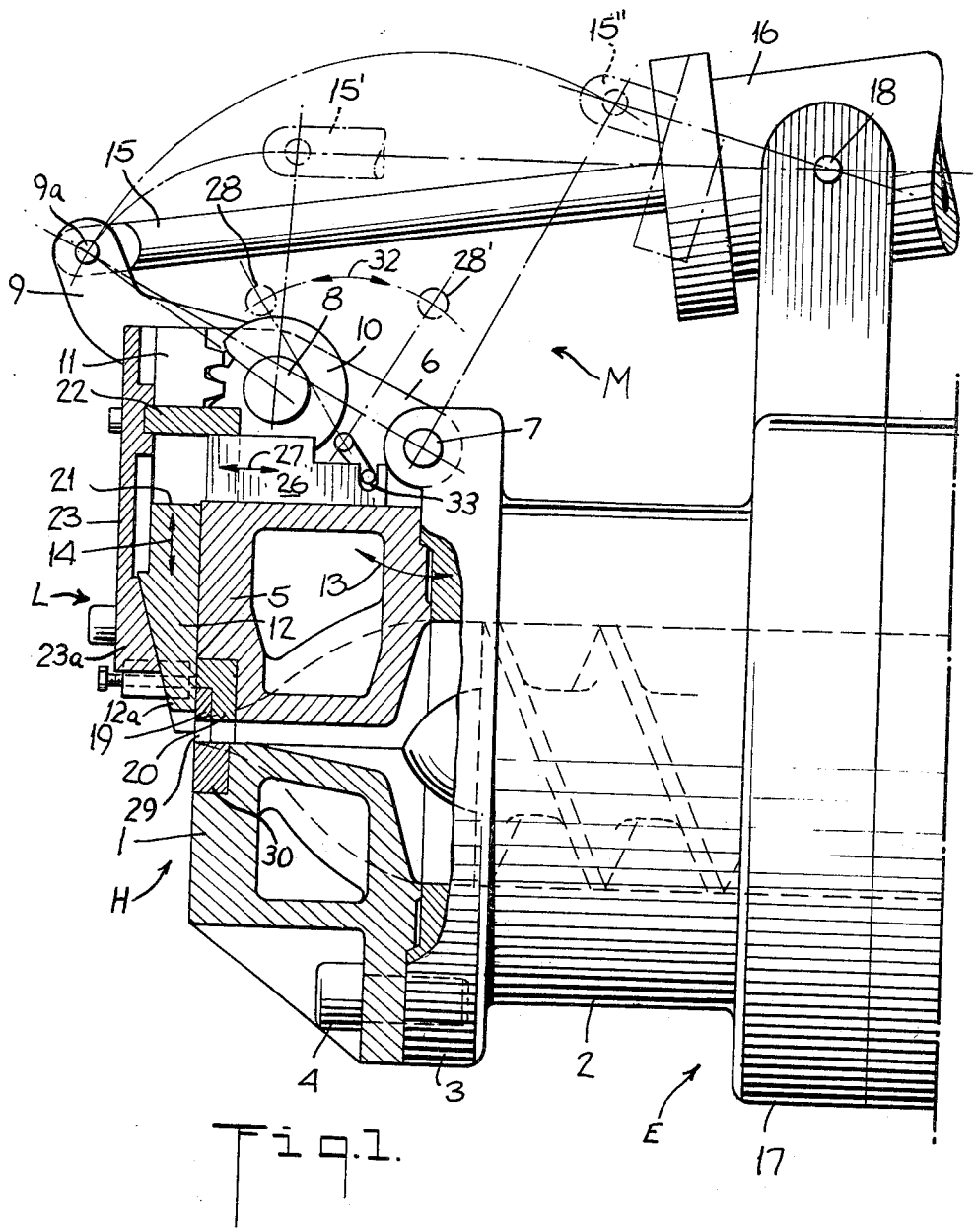
Figure 8:
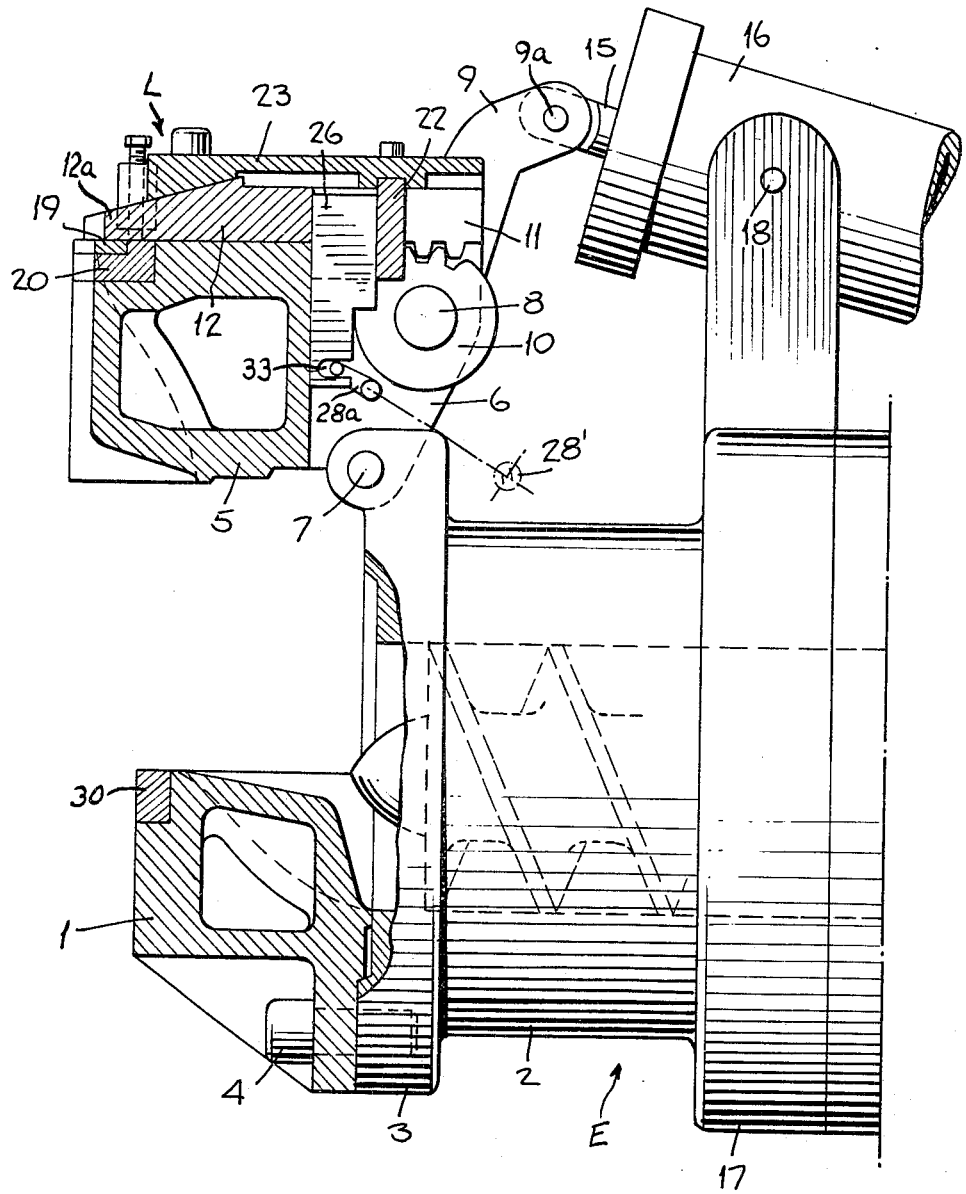

This invention relates to extruders of the type having an openable die head structure generally composed of a stationary member fixed to the machine head and a cooperating movable member which carries a replaceable die element releasably locked thereto, and to a mechanism operable to shift both the die locking means and the movable die head member into and out of their respective operating positions.

An openable die head structure for an extruder commonly is used when the die head structure is one which must be thoroughly cleaned, either whenever the compound to be extruded is being changed, or upon interruption or conclusion of an extrusion operation, in order to ensure that no residues of the previous stock remain. Especially in the processing of rubber and similar materials, these residues would scorch in the hot die head structure and would ultimately cause troubles in the extruder operation. Since the cleaning of a one-part die head structure which is not openable is very difficult, especially in these cases, the use of the above-mentioned openable die head structures has come into vogue. In general, the releasable means for clamping the movable die head member tightly against the head of the machine are screw bolts, while the means for clamping the movable member against the stationary member of the die head structure take the form of yoke-type clamps which are also tightened by means of screw bolts.

In one class of these known extruders, a replaceable profiled die is mounted on the movable member of the die head structure and can be releasably clamped and locked to said member by means of a gib and key operated by a suitable mechanism associated therewith. The replacement of the die can be done either separately from or in connection with the releasing and reclamping of the movable member of the die head structures.

The process of cleaning the die head structure and replacing the die of such an extruder is as follows. First the key is raised by means of a pneumatic piston and cylinder device, whereupon the die is disconnected. After this, the clamping means which in operation clamp the movable die head member against the stationary one, are released, and thereafter the bolts which clamp the movable member against the machine head are loosened. The movable member is then lifted off by means of a small hoist fastened on a rotatable bracket arm, and the stationary and movable die head members are cleaned. The reassembling of the die head structure, including re-inserting the die and clamping and locking the die by means of the gib and key is done in reverse order. The labor involved in performing these operations is physically very exacting and entails a considerable expenditure of time.

The basic object of the present invention, therefore, is the provision of an openable die head structure in which the operating mechanism for the gib and key used to lock and release the die also serves as the means for mechanically lifting and lowering the movable die head member out of and into its closed or operating position.

Another object of the present invention is the provision of such a die head structure wherein the die-retaining key and the movable die head member can be shifted into and out of their respective operating positions by the operating mechanism either individually or jointly and in any desired sequence.

Yet another object of the present invention is the provision, for an openable die head structure, of an operating mechanism as aforesaid the construction of which is as simple as possible.

To this end, the openable extruder die head structure is characterized, according to the present invention, by a pivotal mounting of the movable die head member on the machine head, by a mounting of the gib and key on the movable member, and by the provision of stop means on the movable member to limit the maximum extent of individual movement of the key in either the die-releasing or the die-locking sense relative to the movable member and to ensure a joint die head-opening or closing movement of the latter with the key upon continued activation of the operating mechanism whenever individual key movement is restrained by the respective stop means.

With such an arrangement, if only the die has to be changed, the means for clamping the movable member of the die head structure shut with tight sealing need not be released. Upon activation of the operating mechanism only the key is then shifted in the die-releasing direction up to a predetermined first limit stop. After the die has been replaced, activation of the operating mechanism in the reverse sense shifts the key in the die-locking direction to the extent permitted by the gib defining the opposed limit stop.

If, on the other hand, the movable die head member is to be moved to its open position, the clamping means therefor are first released. With the operating mechanism conditioned as before, activation thereof causes the key to be shifted in the die-releasing direction until it reaches the aforesaid first limit stop. As this takes place, however, the movable die head member does not move, despite the prior releasing of the clamping means. Only upon continued activation of the operating mechanism in the same sense is the movable die head member pivoted to the open position thereof, by virtue of the fact that the forces then being exerted on the key are transmitted through the engaged first limit stop to the movable member. The pivoting of the movable member is continued until the same has been raised as far as necessary for the convenient cleaning thereof and of the stationary die head member, it being generally sufficient if the movement covers an arc of about 90°.

For a subsequent die head-closing and die locking operation, the weight distribution in the movable die head member, the looseness or tightness of the pivotal mounting of the movable member on the machine head, and the looseness or tightness of the sliding movement of the key in relation to the movable member, will determine whether, upon appropriate reverse activation of the operating mechanism, the key is first pushed into the locking position and the movable member then swung back into the closed position, or vice versa. It is found to be advantageous, however, if the movable member is first swung into the closed position aided by its own dead weight, with the key during this time still being in the die-releasing position, and if the die-locking movement of the key occurs only when the movable member has reached its closed position, since then the die can conveniently still be inserted after the end of the die head-closing movement.

A preferred embodiment of the die head structure and operating mechanism therefor according to the present invention is characterized by the provision of a pair of side plates rigidly attached to the movable die head member and pivotally mounted on the front flange of the machine head, the side plates providing the bearing locations for a rotatable shaft extending therebetween parallel to the pivot axis of the movable member. Fixed to the shaft is a plurality of pinions which mesh with respective toothed racks attached to the die-retaining key, the latter being constrained for linear reciprocal movement in the direction of movement of the toothed racks. Also fixed to and extending from the shaft is an operating arm to the free end of which is articulated the outer end of a piston rod extending from the piston of a double-acting fluid pressure cylinder rockably mounted on a rear flange of the machine head. The gib is defined by an outer cover or face plate rigidly secured to the front of the movable member and having opposite the die location a tapered surface mated to the tapered surface of the wedge-shaped key so as to define a limit stop at that end of the path of movement of the key. A transverse stop plate rigidly mounted on the inside of the cover plate serves as a limit stop at the opposite end of the path of movement of the key.

A preferred refinement of the extrusion die head construction according to the invention is characterized by the provision of a slide bolt on the movable member of the die head structure for enabling a releasable blocking of the key against movement only in the position of the key in which the die is clamped and locked in place. The direction of motion of the slide bolt is preferably transverse to the direction of motion of the key. Thus, when the slide bolt is retracted, it is without effect and enables attainment of those movement conditions which have been described previously herein. The slide bolt can be moved forward only when the key is in the die-locking position, and when so disposed blocks the key from being shifted out of that position. Upon activation of the operating mechanism under such circumstances in the sense of a die-release, there is no movement of the key relative to the movable die head member, with the slide bolt defining yet another limit stop for the key, but only an upward pivoting of the movable member into its open position. In this way, if it is desired not to replace the die but only to clean the parts of the die head structure, the movable member thereof can be pivoted out of, and later returned to, its closed position without moving the key or unlocking the die. Preferably, a hand lever is provided for operating the slide bolt, so that the particular operating steps desired can easily be set at will.

The foregoing and other objects, characteristics and advantages of the present invention will be more clearly understood from the following detailed description thereof when read in conjunction with the accompanying drawings, in which:

FIG. 1 is a fragmentary, partly sectional, side elevational view of the front part of an extruder having an openable die head structure and an operating mechanism therefor in accordance with the present invention, both the movable die head member and the die-locking key being shown in their operating positions; and FIGS. 2 and 3 are similar views of the extruder but show the said operating mechanism in different stages of operation to achieve, respectively, a release of the die without the die head structure being opened, and an opening of the die head structure without a release of the die.

Referring now to the drawings in greater detail, the extruder E is seen to have an openable die head structure H including a stationary lower member 1 rigidly secured to the machine head 2 at the front flange 3 thereof by means of screw bolts 4, and a movable upper member 5. The screw bolts 4 are not intended to be loosened in operation, and hence the stationary member 1 of the die head structure may be considered as permanently firmly connected with the flange 3.

The movable die head member 5 is provided with a pair of rigid side plates 6, which may be integral with it. The side plates 6 are pivotally mounted on the flange 3 of the machine head 2 by means of hinges 7, thereby to enable the movable member 5 to be swung up and down as indicated by the double-headed arrow 13 (FIG. 1). Rotatably journaled in the side plates 6 is a shaft 8 which extends parallel to the pivot axis 7 and has affixed thereto an operating arm 9 and a plurality of gears or pinions 10. The pinions 10 mesh with respective toothed racks 11 arranged for vertical reciprocal movement. The free end of the arm 9 is articulated at 9a to the outermost end of a piston rod 15 which is connected at its other end with a piston (not shown) disposed for axial reciprocal movement in a double-acting fluid pressure power cylinder 16 rockably mounted on the rear flange 17 of the machine head 2 by means of pivots 18.

The die head structure H defines the extrusion and shaping orifice 29 (FIG. 1) of the extruder, this orifice in the illustrated system having, by way of example, the contours of a vehicle tire tread strip and being defined between a lower straight-edged die element or wear plate 30 fixed by screws (not shown) to the stationary die head member 1, and an upper replaceable profiled die 19 and an associated preforming die 20 carried by the movable die head member 5. The dies 19 and 20 are retained on the member 5 and releasably locked thereto by a gib and key type of slide lock means L which will now be described.

The die locking means L comprises a wedge-shaped bar or key 12 which extends across the entire front face of the movable die head member 5 and is constrained to reciprocal sliding linear movement relative thereto in the direction indicated by the double-headed arrow 14 (FIG. 1). The key 12, to the uppermost edge 21 of which the racks 11 are fixedly secured, tapers in the downward direction, providing a frontwardly facing slanted surface 24, and is so dimensioned that its lowermost and narrowest edge region 12a overlies the location of the dies 19 and 20 when its uppermost edge 21 is substantially flush with, but preferably just a shade lower than, the upper surface of the movable member 5. To define this bottom stop position, there is rigidly secured to the movable member 5 a front cover plate 23 the lowermost edge region 23a of which is wedge-shaped in a sense opposite to that of the key 12 and thus constitutes the gib of the die-locking means L, providing a rearwardly facing slanted surface 25 adapted to be engaged by the correspondingly slanted surface 24 of the key 12. The cover plate 23 also has rigidly secured thereto a transverse abutment or stop plate 22 extending toward and partly over the top of the movable member 5, to define a second stop position for the key 12, the location being such that the dies 19 and 20 are freed of restraint when the upper edge 21 of the key 12 engages the bottom face of the stop plate 22.

Slidably mounted atop the movable member 5 is a slide bolt 26 arranged for reciprocal movement toward and away from the cover plate 23, as indicated by the double-headed arrow 27 (FIG. 1). The height of the slide bolt is substantially equal to that of the space between the stop plate 22 and the top of the movable member 5, and thus effectively also to the height of the gap between the stop plate 22 and the top edge 21 of the key 12 when the latter is in its die-locking position. Displacement of the slide bolt 26 from one to the other of its positions is effected by means of a hand lever 28 (shown schematically only) which is pivotally supported at 31 by the side plates 6 for reciprocal angular movement as indicated by the double-headed arrow 32 and has an extension 28a drivingly connected to the slide bolt by means of a pin and slot connection 33. Accordingly, when the bolt is moved to its forward position, it blocks any movement of the key 12 out of its die-locking position.

It will be understood, of course, that the extruder E will normally be equipped with clamping means for pressing the movable member 5 of the die head structure H against the head 2 of the machine and against the stationary member 1 of the die head structure with tight sealing during an extrusion operation, to counterbalance the extremely high extrusion pressure-created forces tending to separate the movable member from the stationary one and the machine head. It should be noted that the cylinder 16 functions only as a part of the operating mechanism for the movable die head member 5 and the die-locking means L, but does not play any part in clamping the die head structure shut. For the sake of simplicity and clarity, and in view of the fact that the particular clamping means which may be utilized constitute no part of the present invention, they have not been illustrated or described in detail herein. An especially advantageous class of clamping means designed for use with openable die head structures of the type to which the present invention pertains, however, is that disclosed and claimed in my prior copending application titled "Die Head Clamping Means For Extruders." Such clamping means are characterized by the provision of a pair of clamps pivotally mounted on opposite sides of the die head structure for angular movement laterally toward and away from the movable die head member, each clamp being engageable with a respective projecting lug (not shown) of the movable member and oriented, when in the operating position, generally in the direction of the resultant of the internal pressure-created force components acting on the movable member in specified directions bearing predetermined relationships to the respective contact surfaces between the movable member and the machine head on the one hand, and between the movable member and the stationary member on the other hand.

Reverting now to the system of the present invention, during the course of an extrusion operation the die head structure H and the die-locking means L are in their respective operating positions illustrated in FIG. 1, the movable die head member 5 being clamped tightly to the stationary member 1 and machine head 2, the key 12 being at its lowest stop position, and the cylinder 16 and piston rod 15 of the operating mechanism M for the die head structure and the die-locking means (which mechanism, of course, also comprises the arm 9, shaft 8, pinions 10, racks 11, slide bolt 26 and lever 28–28a) being in their solid-line positions illustrated in FIG. 1.

If, now, at the end of the extrusion operation, it is desired to remove the die 19 and/or the preforming die 20 for cleaning or replacement by different dies, pressure is admitted into the cylinder 16 to retract the piston rod 15, whereby the arm 9 is swung in a clockwise direction (as seen in FIG. 1). This motion is transmitted through the shaft 8 to the pinions 10 the rotation of which causes the toothed racks 11 and the key 12 to move upwardly until the upper edge 21 of the key engages the bottom face of the stop plate 22. At this point, the various parts are in the positions shown in FIG. 2 (the piston rod position is also shown in phantom outline in FIG. 1 at 15'), except that the die 19 and the preforming die 20 are missing, having already been removed. For the performance of the so far described operation, therefore, it is not even necessary to release the clamps from the movable die head member 5, although this may be done if desired.

Preparatory to the next extrusion run, of course, either the cleaned dies or replacements therefor are properly inserted on the movable member 5, and the cylinder is then activated in reverse to return the key 12 to its locking position.

Should it be desired at the end of an extrusion run to open the die head structure and clean the same without rleasing the dies 19 and 20, the die head clamps are released and the handle or lever 28 is shifted from left to right, as seen in FIG. 1, to the position designated 28' in FIGS. 1 and 3, so as to move the slide bolt 26 into the space between the key 12 and the stop plate 22. Under these conditions, activation of the cylinder 16 to retract the piston rod 15 does not produce an angular clockwise movement of the arm 9 about the axis of the shaft, since the key 12 cannot move due to the blocking action of the bolt 26 which in turn keeps the racks and pinions stationary. The lifting force exerted on the key is, however, transmitted via the bolt 26, the stop plate 22 and the cover plate 23 directly to the movable member 5, whereby the latter is swung upwardly about the pivot hinges 7 into its open position illustrated in FIG. 3 (the corresponding piston rod position is also shown in phantom outline in FIG. 1 at 15").

If it is desired to clean the die head structure and also remove the dies therefrom, the die head clamps are released and the slide bolt 26 retained in its retracted position, as shown in FIG. 1. Upon activation of the cylinder 16, to retract the piston rod 15, therefore, the key 12 will first be raised, as previously described, until the edge 21 thereof abuts against the stop plate 22 (see FIG. 2). The dies can then be removed, whereupon the action of the cylinder 16 is continued in the same direction. Since the key 12 can no longer move upwardly any more with respect to the movable member 5 of the die head structure, the lifting forces exerted on the key are transmitted via the stop plate 22 and the outer cover plate 23 to the movable die head member 5, whereby the latter is swung upwardly about the axis 7 in a clockwise direction until it has assumed approximately the position illustrated in FIG. 3. Any difference will generally be due to the fact that a portion of the piston stroke was used for raising the key 12 before the swinging of the member 5 began. It should be noted that at this time the position of the key relative to the movable member 5 will not be that shown in FIG. 3 but rather will be that shown in FIG. 2.

Although, as has been described, whenever the slide bolt 26 is not used, the raising of the key 12 always occurs first, i.e. prior to the pivoting of the movable member 5 of the die head structure, in the reverse direction the sequence of movements, i.e. whether the key 12 is pushed back against the gib 23a before the movable member 5 swings downwardly or whether the opposite of this takes place, will depend on the ease or difficulty of action of the various bearings and on the weight distribution of the total masses moving about the pivot axis 7. It is nevertheless deemed preferable that the weight of the movable member 5 and the other related factors outlined above be such as to cause said member to move downwardly upon reversal of the cylinder 16 while the key 12 still remains against the stop plate 22, with the key then moving downwardly only after the member 5 has reached its closed position. The reason for this is that reinsertion of the dies can be done more easily after the conclusion of the closing movement of the movable member 5.

The construction according to the present invention as herein described has the following advantages. The operating procedures described require no physically exacting work, and the expenditure of time required for such procedures is shortened considerably. By reason of the fact that the mechanical raising and lowering of the key out of and into its die-locking position at the same time also brings about the raising and lowering of the movable die head member, the need for providing special working elements for raising and lowering said member is avoided. The entire system, moreover, is especially advantageous and economical by virtue of the use of simple construction elements which are easy to produce and able to withstand prolonged and strenuous operation and which, in combination, impart to the system its great versatility of operation without causing any kind of complications to arise.

It will be understood that the foregoing description of a preferred embodiment of the present invention is for purposes of illustration only, and that the various structural and operational features herein disclosed are susceptible to a number of modifications and changes none of which entails any departure from the spirit and scope of the present invention as defined in the hereto appended claims.

Having thus described my invention, what I claim and desire to protect by Letters Patent is:

1. In an extruder having an openable die head structure at the head of the machine, which die head structure includes a stationary member fixed to said machine head, a cooperating movable member required, for purposes of an extrusion operation, to be closed with tight sealing against both said machine head and said stationary member, die means releasably carried by said movable member, and gib and key locking means mounted on said movable member for selectively locking said die means in, and releasing the same from, the operating position thereof; the improvement comprising pivot means mounting said movable member on said machine head for angular movement between closed and open positions, the key portion of said locking means being reciprocally displaceable on said movable member, the gib portion of said locking means being fixed to said movable member and defining a first stop for said key portion corresponding to the die-locking position, abutment means carried by said movable member and defining a second stop for said key portion corresponding to the die-releasing position, and an operating mechanism interconnected between said key portion and a stationary location spaced from said movable member, whereby activation of said operating means in one direction or the other is effective to displace said key portion respectively out of and into said die-locking position, while further activation of said operating mechanism in said one direction subsequent to arrival of said key portion at said second stop is effective to swing said movable member from said closed position to said open position thereof.

2. In an extruder according to claim 1; the further improvement comprising slide bolt means carried by said movable member and adapted to be shifted into and out of the space defined between said abutment means and said key portion when the latter is in said die-locking position thereof, said slide bolt means when shifted into said space being effective to block movement of said key portion toward said second stop, whereby activation of said operating mechanism in said one direction with said slide bolt means shifted into said space is immediately effective to swing said movable member from said closed position to said open position without prior release of said die means.

3. In an extruder according to claim 1; said operating mechanism comprising a fluid pressure-activated piston and cylinder combination.

4. In an extruder according to claim 1; said movable member comprising a pair of side plates rigidly affixed thereto, said pivot means interconnecting said side plates with said machine head, and said operating mechanism comprising a shaft rotatably journaled in and extending between said side plates parallel to the axis of said pivot means, an arm fixed to and extending from said shaft, gear means fixed to said shaft, rack means slidably mounted on said movable member, said rack means being connected to said key portion and having the teeth thereof in mesh with said gear means, and power means interconnected between said arm and said machine head.

5. In an extruder according to claim 4; the further improvement comprising a reciprocal slide bolt carried by said movable member and adapted to be protracted into and retracted out of the space defined between said abutment means and said key portion when the latter is in said die-locking position thereof, and an actuating lever pivotally mounted on said side plates and drivingly linked to said slide bolt for reciprocating the same, said slide bolt when protracted into said space being effective to block movement of said key portion toward said abutment means, whereby activation of said power means in said one direction with said slide bolt protracted is immediately effective to swing said movable member from said closed position to said open position without prior release of said die means.

6. In an extruder according to claim 4; said power means comprising a double-acting fluid pressure cylinder rockably mounted on said machine head, and a piston reciprocally axially slidable in said cylinder and having a piston rod extending therefrom, the outer end of said piston rod being articulated to said arm means.

7. In an extruder according to claim 6; said pivot means being located at the front end of said machine head, the rocking axis of said cylinder being located rearwardly of said pivot means, and said shaft being located frontwardly of said pivot means when said movable member is in its closed position.

8. In an extruder according to claim 7; said movable member further comprising a cover plate rigidly secured to the front face of said movable member, said key portion being disposed between said cover plate and said front face of said movable member, said gib portion being constituted by the section of said cover plate juxtaposed to said die means, and said abutment means being constituted by a stop plate rigidly secured to said cover plate at a different section thereof and extending therefrom toward said movable member.

9. In an extruder according to claim 8; said stop plate being disposed at a level above the top surface of said movable member, the further improvement comprising a reciprocal slide bolt carried by said movable member on the top surface thereof and adapted to be protracted into and retracted out of the space defined between said stop plate and said key portion when the latter is in said die-locking position thereof, said slide bolt being of the same height as said space and when protracted into said space being effective to block movement of said key portion toward said stop plate, whereby activation of said cylinder to retract said piston rod with said slide bolt protracted is immediately effective to swing said movable member from said closed position to said open position without prior release of said die means.

10. In an extruder according to claim 9; an actuating lever pivotally mounted on said side plates and drivingly linked to said slide bolt for reciprocating the same.

References Cited

UNITED STATES PATENTS

| 1,947,202 | 2/1934 | Homeier. |
|---|---|---|
| 2,486,474 | 11/1949 | Henning. |
| 2,773,283 | 12/1956 | Malamoud et al. |
| 2,897,543 | 8/1959 | Weston et al. |
| 3,407,441 | 10/1968 | Vigansky et al. |

FOREIGN PATENTS

| 592,409 | 3/1959 | Italy. |
|---|---|---|

WILLIAM J. STEPHENSON, Primary Examiner